(12) United States Patent  
Lean et al.

(10) Patent No.: US 8,647,479 B2  
(45) Date of Patent: Feb. 11, 2014

(54) STAND-ALONE INTEGRATED WATER TREATMENT SYSTEM FOR DISTRIBUTED WATER SUPPLY TO SMALL COMMUNITIES

(75) Inventors: Meng H. Lean, Santa Clara, CA (US); Armin R. Volkel, Mountain View, CA (US); Scott A. Elrod, La Honda, CA (US); Nitin S. Parekh, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 743 days.

(21) Appl. No.: 12/484,038

(22) Filed: Jun. 12, 2009

(65) Prior Publication Data

US 2010/0314263 A1    Dec. 16, 2010

(51) Int. Cl.  
*C02F 1/46* (2006.01)

(52) U.S. Cl.  
USPC ........ 204/242; 204/275.1; 210/260; 210/304; 210/319

(58) Field of Classification Search  
USPC ................ 204/242, 275.1; 210/260, 304, 319  
See application file for complete search history.

(56) References Cited

U.S. PATENT DOCUMENTS

| | | | |
|---|---|---|---|
| 3,586,627 A * | 6/1971 | Gooch | 210/717 |
| 3,933,642 A | 1/1976 | Wilson | |
| 4,179,616 A | 12/1979 | Coviello et al. | |
| 4,388,195 A | 6/1983 | Von Hagel et al. | |
| 4,546,922 A | 10/1985 | Thometz | |
| 4,563,279 A | 1/1986 | Wright | |
| 5,093,008 A | 3/1992 | Clifford, III | |
| 5,208,461 A | 5/1993 | Tipton | |

(Continued)

FOREIGN PATENT DOCUMENTS

| | | |
|---|---|---|
| CN | 1149556 A | 5/1997 |
| CN | 1930090 A | 3/2007 |

(Continued)

OTHER PUBLICATIONS

Ookawara et al., "Feasibility Study on Concentration of Slurry and Classification of Contained Particles by Microchannel," Chemical Engineering Journal, v. 101, pp. 171-178, 2004.

(Continued)

*Primary Examiner* — Arun S Phasge  
(74) *Attorney, Agent, or Firm* — Fay Sharpe LLP

(57) ABSTRACT

Provided is a standalone integrated water treatment system for a distributed water supply. A filter input receives water to be treated. A coagulation system is in operative connection with the filter input, wherein the water which has been filtered is subjected to a coagulation process performed by the coagulation system to create pin floc from suspensions in the water. A maturation buffer tank is in operative connection with the coagulation system, wherein floc is aggregated in size within the water. A spiral separator is in operative connection with the maturation buffer tank, and the water is separated into two water streams, a first stream of water having most of the floc removed, and a second stream of water which includes a concentrated amount of the floc. An optional filtration system is in operative connection with the spiral separator and is configured to receive the first stream of water and to perform a filtration operation on the first stream of water. A sterilization system is in operative connection with the optional filtration system and is configured to perform a sterilization operation on the first stream of water. The water is then output from the sterilization system as potable water.

23 Claims, 10 Drawing Sheets

(56) References Cited

U.S. PATENT DOCUMENTS

| | | | |
|---|---|---|---|
| 5,549,827 A | 8/1996 | Batson | |
| 5,690,763 A | 11/1997 | Ashmead et al. | |
| 5,910,254 A | 6/1999 | Guelcher et al. | |
| 5,993,668 A * | 11/1999 | Duan | 210/713 |
| 6,461,520 B1 | 10/2002 | Engelhard et al. | |
| 6,569,323 B1 | 5/2003 | Pribytkov | |
| 6,582,592 B2 * | 6/2003 | Arnaud | 210/96.1 |
| 6,613,217 B1 | 9/2003 | Gilmore | |
| 6,773,609 B1 * | 8/2004 | Hashizume | 210/748.15 |
| 6,866,757 B2 | 3/2005 | Gilmore | |
| 6,902,313 B2 | 6/2005 | Ho et al. | |
| 6,916,113 B2 | 7/2005 | Van de Goor et al. | |
| 7,160,025 B2 | 1/2007 | Ji et al. | |
| 7,217,933 B2 | 5/2007 | Gadgil et al. | |
| 7,258,800 B1 | 8/2007 | Herbst | |
| 7,344,681 B1 | 3/2008 | Fiechtner et al. | |
| 7,396,459 B2 | 7/2008 | Thorpe | |
| 7,473,216 B2 | 1/2009 | Lolachi et al. | |
| 2004/0013923 A1 * | 1/2004 | Molter et al. | 429/25 |
| 2004/0149662 A1 | 8/2004 | Yamada et al. | |
| 2005/0263448 A1 | 12/2005 | Heist et al. | |
| 2006/0087918 A1 | 4/2006 | Ji et al. | |
| 2007/0048900 A1 | 3/2007 | Jiang et al. | |
| 2008/0128331 A1 | 6/2008 | Lean et al. | |
| 2009/0114601 A1 | 5/2009 | Lean et al. | |
| 2009/0114607 A1 | 5/2009 | Lean et al. | |
| 2009/0283452 A1 | 11/2009 | Lean et al. | |
| 2009/0283455 A1 | 11/2009 | Lean et al. | |
| 2010/0072142 A1 | 3/2010 | Lean et al. | |
| 2010/0314323 A1 | 12/2010 | Lean et al. | |
| 2010/0314325 A1 | 12/2010 | Lean et al. | |
| 2010/0314327 A1 | 12/2010 | Lean et al. | |

FOREIGN PATENT DOCUMENTS

| | | |
|---|---|---|
| CN | 101445284 A | 6/2009 |
| DE | 4200802 A1 | 7/1993 |
| EP | 1795894 A1 | 6/2007 |
| EP | 1942329 A2 | 5/2009 |
| EP | 2058284 A1 | 5/2009 |
| EP | 2060312 A2 | 5/2009 |
| JP | 2005305271 A | 11/2005 |
| JP | 2006-239619 * | 9/2006 |
| JP | 2006239619 A1 | 9/2006 |
| JP | 2007069179 A | 3/2007 |
| JP | 2008136934 A | 6/2008 |
| JP | 2009125695 A | 6/2009 |
| WO | 8901357 | 2/1989 |
| WO | 8901357 A1 | 2/1989 |
| WO | 2004103916 A1 | 12/2004 |
| WO | 2009129586 A1 | 10/2009 |

OTHER PUBLICATIONS

European Search Report, EP10165542.1, Dated Nov. 9, 2010, Completed Oct. 28, 2010, Examiner Bernd Goers, Munich, DE.

Thiruvenkatachari et al., "Flocculation-cross-flow microfiltration hybrid system for natural organic matter (NOM) removal using hematite as a flocculent", Desalination, Elsevier, Amsterdam, NL LNKD-DOI:10.1016/S0011-9164(02) 00580-5, vol. 147, No. 1-3, Sep. 10, 2002, pp. 83-88.

Bazrafshan, E., et al., "Performance Evaluation Of Electrocoagulation Process For Diazinon Removal From Aqueous Environments By Using Iron Electrodes", Iran J. Environ. Health. Sci. Eng., 2007, pp. 127-132, vol. 4, No. 2, Iran.

Hart, James, et al., "A Water Purification System For Remote Villages Utilizing Ultraviolet Sterilization And Photovoltaics", Proceedings of the 2003 National Solar Energy Conference of the American Solar Energy Society, 2003, 7 pgs.

Rahmani, AR. Ph.D., "Removal of Water Turbidity By The Electrocoagulation Method", J. Res. Health Sci., 2008, pp. 18-24, vol. 8, No. 1.

European Search Report, EP2058284A1, Dated Oct. 5, 2010, Completed Sep. 22, 2010, Examiner Renato Serra, Munich, DE.

Chinese Search Report, Application No. 201010208513.3, Filed Jun. 11, 2010, Dated May 25, 2013.

* cited by examiner

STAND-ALONE INTEGRATED WATER TREATMENT SYSTEM FOR DISTRIBUTED WATER SUPPLY TO SMALL COMMUNITIES

CROSS REFERENCE TO RELATED PATENTS AND APPLICATIONS

Cross Reference is hereby made to related patent applications, U.S. patent application Ser. No. 12/484,058, filed Jun. 12, 2009 (now published as US2010-0314327A1), by Lean et al., entitled, "Platform Technology For Industrial Separations"; U.S. patent application Ser. No. 12/484,005, filed Jun. 12, 2009 (now published as US-2010-0314325-A1, by Lean et al., entitled, "Spiral Mixer for Floc Conditioning"; and U.S. patent application Ser. No. 12/484,071, filed Jun. 12, 2009 (now published as US-2010-0314323-A1), by Lean et al., entitled, "Method and Apparatus For Continuous Flow Membrane-Less Algae Dewatering", the specifications of which are each incorporated by reference herein in their entirety.

BACKGROUND

Clean water is an increasingly scarce commodity in the world and is particularly an acute issue in the developing world. Most contemporary water treatment systems require a complex, expensive infrastructure, including large installations, chemical supply and storage facilities, electrical energy and machinery to support communal water treatment, such infrastructure is often not available for small communities.

INCORPORATION BY REFERENCE

U.S. Patent Application Publication No. 2008-0128331-A1, published Jun. 5, 2008, entitled, "Particle Separation And Concentration System"; U.S. Patent Application Publication No. 2009-0114607A1, published on May 7, 2009, entitled, "Fluidic Device And Method For Separation Of Neutrally Buoyant Particles"; U.S. Patent Application Publication No. 09-0114601-A1, published May 7, 2009, entitled, "Device And Method For Dynamic Processing And Water Purification"; U.S. patent application Ser. No. 12/120,093, filed May 13, 2008, entitled, "Fluidic Structures For Membraneless Particle Separation"; U.S. patent application Ser. No. 12/120,153, filed May 13, 2008, entitled, "Method And Apparatus For Splitting Fluid Flow In A Membraneless Particle Separator System; U.S. patent application Ser. No. 12/234,373, filed Sep. 19, 2008, entitled, "Method And System For Seeding With Mature Floc To Accelerate Aggregation In A Water Treatment Process"; U.S. patent application Ser. No. 12/484,071, filed Jun. 12, 2009 (now published as US-2010-0314323-A1), entitled, "Method And Apparatus For Continuous Flow Membrane-Less Algae Dewatering"; U.S. patent application Ser. No. 12/484,005, filed Jun. 12, 2009 (now published as US-2010-0314325-A1, entitled, "Spiral Mixer For Floc Conditioning"; U.S. patent application Ser. No. 12/484,058, filed Jun. 12, 2009 (now published as US2010-0314327A1), entitled, "Platform Technology For Industrial Separations", all naming Lean et al. as inventors; and U.S. Pat. No. 7,160,025, issued Jan. 9, 2007, and entitled Micromixer Apparatus And Method Of Using Same", to Ji et al.; are each hereby incorporated by reference in their entirety.

BRIEF DESCRIPTION

Provided is a standalone integrated water treatment system for a distributed water supply. A filter input receives water to be treated. A coagulation system is in operative connection with the filter input, wherein the water which has been filtered is subjected to a coagulation process performed by the coagulation system to create pin floc in the water. A maturation buffer tank is in operative connection with the coagulation system, wherein pin floc grows by aggregation to exceed the separable size within the water. A spiral separator is in operative connection with the maturation buffer tank, and the water is separated into two water streams, a first stream of water having most of the floc removed, and a second stream of water which includes a concentrated amount of the floc. An optional filtration step is in operative connection to the spiral separator and is used to treat the first stream of water. A sterilization system is in operative connection with the filtration device, if present, and is configured to receive the first stream of water and to perform a sterilization operation on the first stream of water. The water is then output from the sterilization system as potable water.

DETAILED DESCRIPTION

Figure 1:
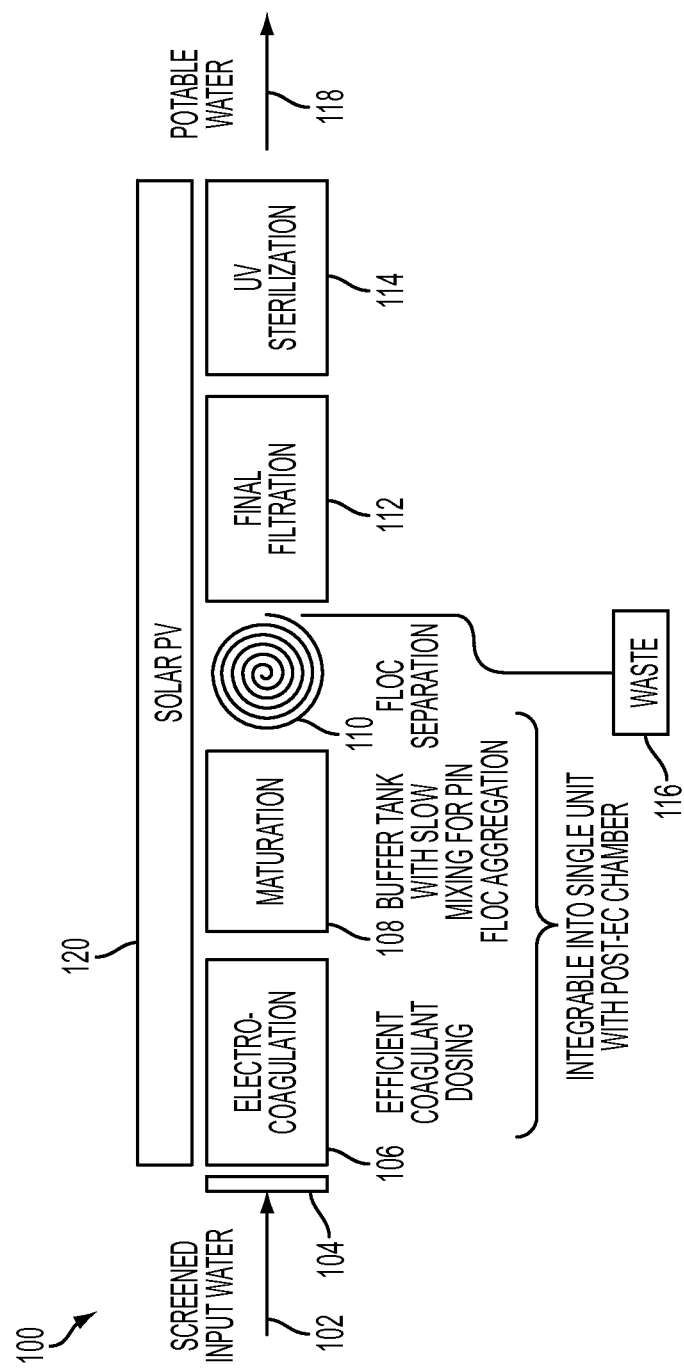
FIG. 1 depicts a block diagram of a standalone integrated water treatment system for distributed water supply in accordance with the concepts of the present application.

FIG. 1 is a block diagram illustrating a standalone integrated water treatment system 100 according to the concepts of the present application. Input water 102 from a base water source such as a pond, creek, river, lake, estuary, well, holding tank or other location is provided to system 100 at a filtration/screened input where openings of an input filter/screen arrangement 104 are sized such as to trap particulates above a certain size (e.g., the openings may be sized to block particulates sized larger than 2 mm or 5 mm, depending on the implementation). The screened water is then passed to an electrocoagulation (EC) system 106 designed to act upon the water to remove undesirable suspended solids by creating (small) pin floc. The pin floc laden water is then provided to a maturation buffer tank 108 where particulates are further aggregated to form more mature (larger) floc. In particular, the buffer tank includes a mixing protocol for faster floc formation. Following an appropriate maturation time, the water with the formed floc material, is passed to a spiral separator 110. The spiral separator 110 is designed to separate out floc above a certain size from the water. Thereafter, the stream of water from which the floc has been removed is passed through an optional filter 112 before proceeding through an ultraviolet (UV) sterilization system 114. The stream of the water having the separated floc, i.e., the water not passed to the filter or UV sterilization system 114, is passed out of system 100 to a waste stream or holding tank 116.

The optionally provided final filtration/screening arrangement 112, removes particulates which may have passed accidentally through the preceding processes. The filter can be selected to satisfy U.S. Environmental Protection Agency (EPA) mandates with granular media filters (GMF), as well as other environmental requirements of other countries. The water quality immediately after separation may already exceed regulatory standards in which case, the filter acts as an insurance against abnormal periods of operation such as flow pulsation or sudden spikes in turbidity of the source water. At UV sterilization system 114, microorganisms in water 102 are either sterilized or killed. The water is then output as potable water 118.

In the embodiment of FIG. 1, power for operation of system 100 is provided by a solar or photovoltaic (PV) system arrangement 120. In alternative embodiments, electrocoagulation system 116 and maturation buffer tank 118 are integrated into a single unit having the buffer tank as a post electrocoagulation process chamber, and/or spiral separator 110 and UV sterilization system 112 are integrated into a single unit. In another embodiment the UV system can be extended to perform advanced oxidation of source water contaminants, e.g. by exposing the source water to a UV active surface area coated with a photoactive material such as $TiO_2$, or other appropriate material. The $TiO_2$ serves as a photocatalyst for the UV and, if applied as a nanocoating on the fluid bearing surfaces of spiral separator 110 also acts as an antifouling agent that minimizes bio-film formation. Alternatively, the $TiO_2$ may also be dispersed within the water in the form of nano particles and recovered by spiral separation after the UV sterilization process. Volume dispersion of the $TiO_2$ results in more efficient photocatalysis but this practice is not common due to the need for membranes to recover the dispersion. The spiral separator 110 has been shown to effectively recover $TiO_2$ dispersions which have been aggregated through some chemical modification such as pH adjustment or coagulant and so forth. Thus, in FIG. 1 the UV sterilization block 114 may be implemented as a standalone device, or incorporated into the spiral separator 110. Additional advanced oxidation capability can be integrated either as a coating on the inside surface of spiral separator 110, as $TiO_2$ dispersed within the water or as a combination of the foregoing. Thus in certain embodiments, sterilization may occur before an optional filtering process.

It is appreciated in certain embodiments pumping units are used to move the water from various components of system 100, e.g., input water 102 may be pumped into system 100, as well as into or out of the system's components, such as from electrocoagulation module 106 to maturation buffer tank 108, and from the buffer tank 108 to spiral separator 110, as well as between and/or through other components of system 100. Alternatively, movement of water through the system may fully or in part be accomplished through the use of a gravity feed arrangement. For example, the water to be input to system 100 is located above system 100, where gravity is used to move the water through the system. Further, in certain embodiments, a battery configuration is used to store electricity generated by solar system 120. Then, power is supplied to the various components on an as-needed basis, such as when solar system 120 is not generating electricity.

Still further, while solar system 120 is illustrated as the source of power in FIG. 1 in other embodiments, alternative power sources may be used alone or in conjunction with the solar system 120. One particular alternative configuration is a manual generator or dynamo, where the user cranks the generator or dynamo to charge a connected electrical storage device and/or to power the components directly. In this embodiment, total reliance on the sun is therefore not necessary. Other sources of power which are represented by indicator 120 include power from wind turbines and hydroelectric sources among others.

Additionally, certain safety features may be implemented in alternative designs. For example, pressure relief valves are selectively included to ensure that water pressure within the system does not exceed a certain maximum. Another safety feature that is implemented in various embodiments is an automatic shutdown switch that recognizes the malfunctioning of components of the system, including but not limited to the UV sterilizer. For instance, if a lamp in the UV sterilizer burns out or malfunctions, this state is used as a signal to activate a shutdown switch which shuts down the system, such that unprocessed water does not exit system 100.

Figure 2:
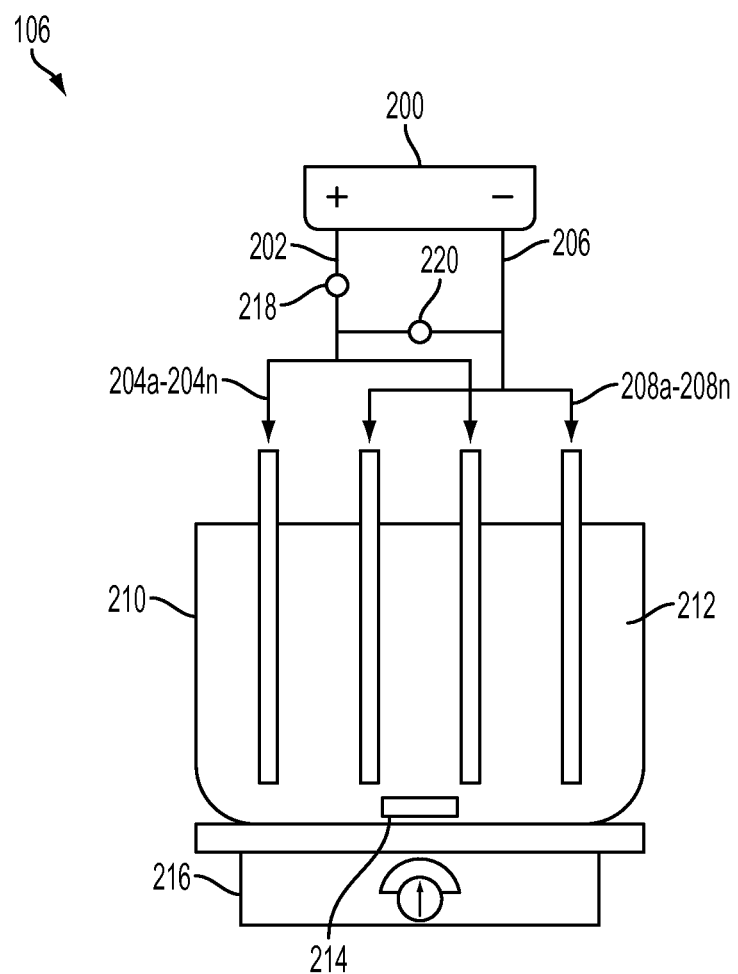
FIG. 2 provides a more detailed figure depicting the operation of an electrocoagulation system.

Turning to FIG. 2, illustrated is a more detailed depiction of the technology of an electrocoagulation system that is used in system 100 of FIG. 1. It is to be appreciated the design of FIG. 2 provides a general description of the operation of electrocoagulation systems, and such systems are known to exist. Companies which supply EC systems include Landa Water Cleaning Systems of Comas, Wash., Forever Pure of Santa Clara, Calif., and Powell Water Systems Inc., Centennial, Colo., among others.

Electrocoagulation system 106 of FIG. 2 includes a DC power supply 200, wherein one side of power supply 200 is connected, via wire line 202, to a plurality of anodes 204a-204n. A second side of power supply 200 is connected, via wiring 206, to a plurality of cathodes 208a-208n. The anodes and cathodes are held within a container 210 which holds water 212 (e.g., water 102 of FIG. 1) being processed. In this embodiment, at the bottom of container 210, a magnetic stirring bar 214 is located in operative connection to a magnetic stirring controller 216. When activated, stirring bar 214 mixes water 212. If it is deemed desirable to monitor operation of electrocoagulation system 106, a current meter 218 is placed in series with line 202 (or line 206), and if voltage of electrocoagulation system 106 is to be monitored, a voltmeter 220 is placed in parallel across lines 202 and 206.

Another common type of coagulation process is achieved by use of chemical coagulation. Similar to electrocoagulation, conventional chemical coagulation is used to destabilize suspensions and to effect precipitation of soluble metals species, as well as other inorganic and organic species from aqueous streams, thereby permitting their removal through sedimentation or filtration. Alum, lime and/or polymers are common chemical coagulants used in such processes. Such conventional chemical coagulation processes however involve adding significant amounts of chemicals to the water in a large basin or other container and tend to generate large volumes of sludge with high bound water content that can be slow to filter and difficult to dewater. Electrocoagulation removes metals, colloidal solids and particles, and soluble inorganic pollutants from aqueous media by introducing highly charged polymeric metal hydroxide species. These species neutralize the electrostatic charges on suspended solids and oil droplets to facilitate agglomeration or coagulation and resultant separation from the aqueous phase. The treatment prompts the precipitation of certain metals.

As shown in FIG. 2, an electrocoagulation system essentially consists of pairs of conductive metal plates in parallel, which act as monopolar electrodes. It furthermore uses a DC power source, a resistance to regulate the current density and a multimeter to read the current values. The conductive metal plates are commonly known as "sacrificial" electrodes and can be of the same or of different materials, such as but not limited to iron.

During electrolysis operation of the electrocoagulation process, the positive side of the system undergoes anodic reactions, while the negative side undergoes cathodic reactions. The polarity of the applied voltage is periodically reversed to sacrifice both electrodes more uniformly. The released ions neutralize the charges of the particles and thereby initiate coagulation. The released ions remove undesirable contaminants either by chemical reaction and precipitation, or by causing the colloidal materials to coalesce, which can then be removed by flotation. In addition, as water containing colloidal particulates, oils, or other contaminants move through the applied electric field, there may be ionization, electrolysis, hydrolysis, and free-radical formation which can alter the physical and chemical properties of water and contaminants. As a result, the reactive and excited state causes contaminants to be released from the water and destroyed or made less soluble.

Returning attention to FIG. 1, once water 102 has been processed using the electrocoagulation system 106, the EC processed water 102 is provided to maturation buffer tank 108. Due to the use of spiral separator 110 in system 100, it is desirable to have the pin floc formed within buffer tank 108 to be aggregated to at least a particular cut-off size. As will be explained in further detail, spiral separator 110 can be adjusted to separate from the water, floc over a certain size. Therefore, it is desirable to grow pin floc within the maturation tank to at least that size such that it is at or above the cut-off size. One discussion of floc development in a maturation buffer tank, such as in the present application, is described in U.S. patent application Ser. No. 12/234,373, "Method And System For Seeding With Mature Floc To Accelerate Aggregation In Water Treatment Process."

Having been processed in buffer tank 108, water 102 is then moved to spiral separator 110 for floc separation.

In one embodiment, the spiral separator may be constructed according to the teachings of the patents and applications incorporated herein, including but not limited to the separator operates in some embodiments as the spiral separators described, for example, in U.S. Publication No. 2008/0128331 A1, having U.S. Ser. No. 11/606,460, filed on Nov. 20, 1006 and entitled "Particle Separation and Concentration System," U.S. Ser. No. 11/936,729, filed on Nov. 7, 2007 and entitled "Fluidic Device and Method for Separation of Neutrally Buoyant Particles," and U.S. Ser. No. 11/936,753, filed on Nov. 7, 2007 and entitled "Device and Method for Dynamic Processing in Water Purification."

Turning to FIGS. 3, 4A, 4B, 5 and 6, concepts for a spiral separator, which is appropriate for use as the spiral separator 110 of the present application are disclosed. It is understood that other embodiments of the spiral separator such as described in the cited and incorporated-by-reference applications are also applicable to the present application.

Figure 3:
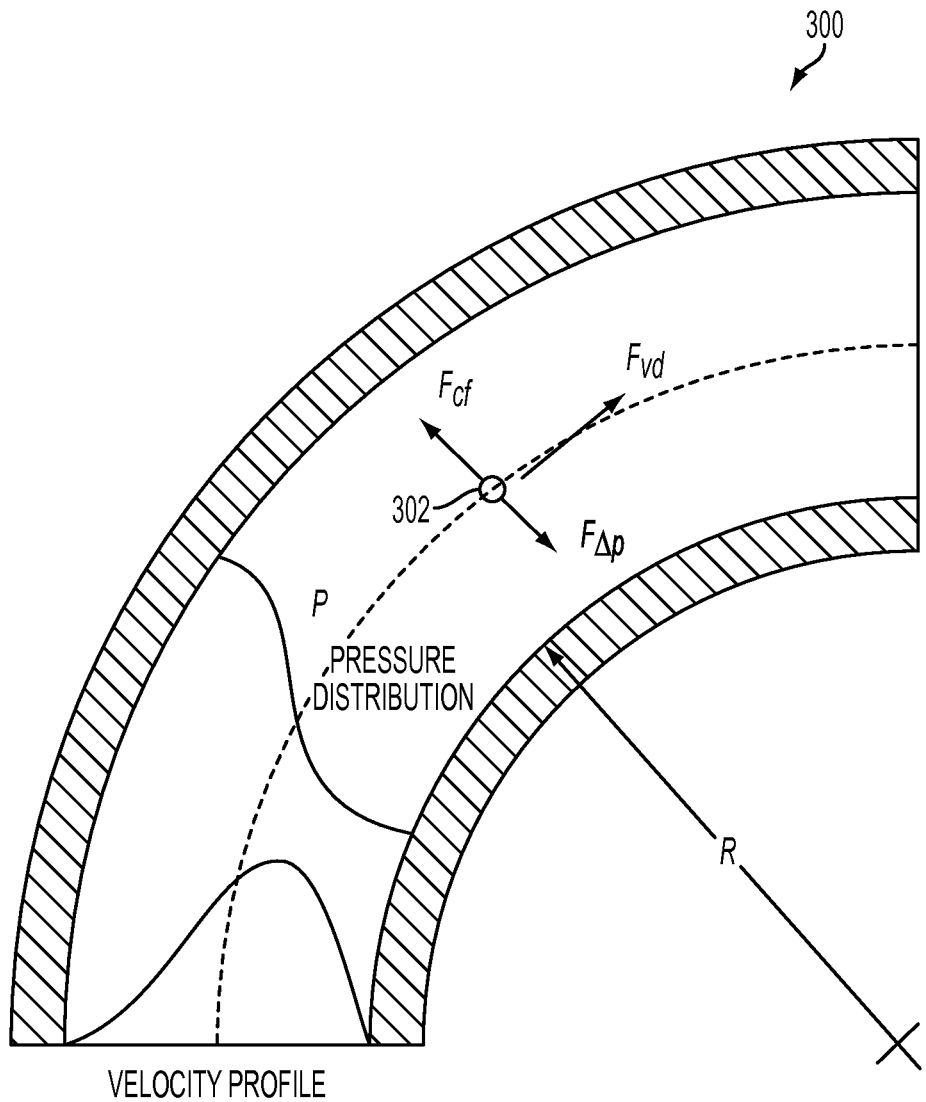
FIG. 3 is a graphic illustration of a fluid channel.

With reference to FIG. 3, a segment of a curved channel 300 showing various forces acting on a particle 302. Also, the velocity profile and the pressure distribution are shown.

Analytic consideration for the flow in a curved channel is as follows. In this regard:
V=Flow velocity
p=Pressure $F_{cf}$=Centrifugal force on the particle
$F_{\Delta p}$=Force due to pressure differential
$F_{vd}$=Force due to viscous drag
R=Radius of curvature of the channel
$\eta$=Dynamic viscosity of the fluid
m=Mass of the particle
r=Radius of the particle assumed to be spherical
$\rho$=Density of fluid The expressions for the centrifugal ($\propto r^3$), transverse pressure driven ($\propto r^2$), and viscous drag forces ($\propto r$) acting on the particle can be expressed as follows:

$$F_{cf} = \frac{mV_\theta^2}{R} = \rho \frac{4}{3}\pi r^3 \frac{V_\theta^2}{R}$$

$$F_{\Delta p} = p\pi r^2$$

$$F_{vd} = 6\pi \eta r V_r$$

The particles will move outwards if $F_{cf} > F_{\Delta p}$, or $$\rho \frac{4}{3}\pi r^3 \frac{V_\theta^2}{R} > p\pi r^2$$

i.e.

$$r > \frac{p}{\rho} \frac{R}{V_\theta^2} \frac{3}{4}$$

Equation (1) can be used to determine the lower bound for particle size that will move outwards for any given geometry, pressure and velocity of flow. Particles smaller than this lower bound will move inwards or $$r < \frac{p}{\rho} \frac{R}{V_\theta^2} \frac{3}{4}$$

The distance of travel before a particle migrates across the flow channel (transverse direction) is dependent on the relative magnitudes of $F_{vd}$ and $F_{\Delta p}$.

Also since $F_{\Delta p} \propto r^2$ and $F_{vd} \propto r$, larger particles will be more affected by the flow induced transverse pressure drop directed towards the inner surface.

The transverse pressure may be derived by considering peripheral flow in a concentric cavity where the parabolic profile fits:

$$V_\theta = V_0(r-r_1)(r_2-r)$$

and $r_1$ and $r_2$ are the inner and outer radii, respectively. The radial Pressure drop, p, is given by:

$$p = \int_1^2 \frac{\rho V_\theta^2}{R} dr =$$

$$V_0^2 \frac{\rho}{R}\left[\frac{r^5}{5} - \frac{(r_1+r_2)r^4}{2} + \frac{r_1^2 + 4r_1r_2 + r_2^2)r^3}{3} - r_1r_2(r_1+r_2)r^2 + r_1^2 r_2^2 r\right]$$

Figure 4A:
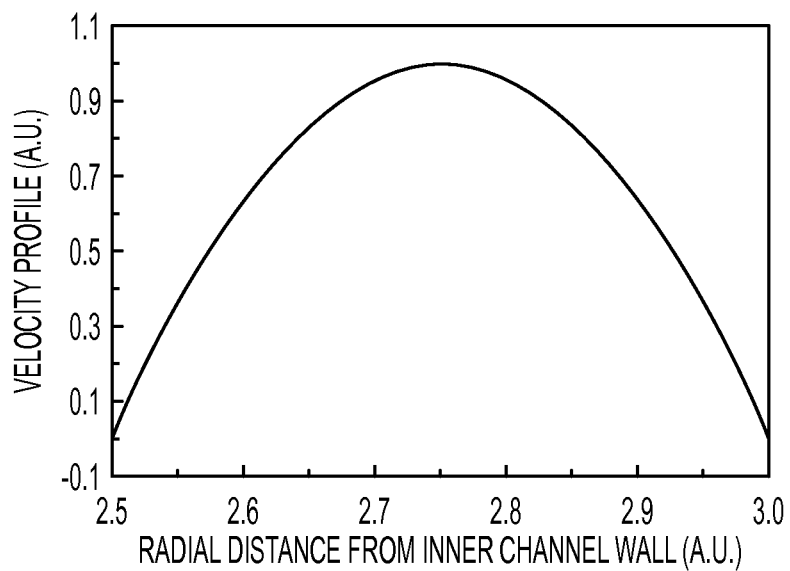
FIGS. 4A and 4B are graphs illustrating a velocity profile and a pressure profile.
Figure 4B:
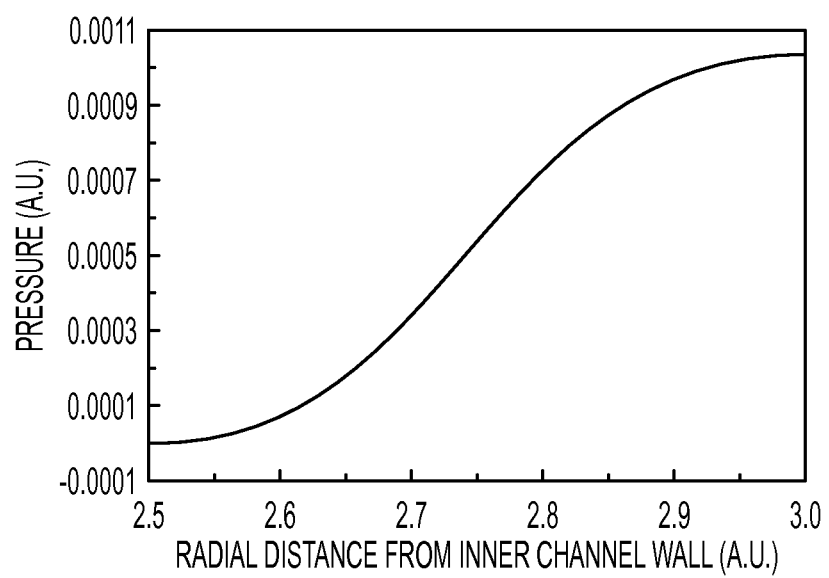

The calculated velocity and pressure profiles are shown in FIGS. 4A and 4B. The pressure is displayed as a function of distance from the inner wall, beginning from $r_1$ and increasing to $r_2$. The inward-directed pressure field (from the outside wall) is clearly evident.

The required flow length of the channels is designed to meet the channel width and flow velocity for the particle size range. The equation of motion in the radial direction for outward directed motion is given by:

$$m\frac{dV_r}{dt} = \frac{mV_\theta^2}{R} - p\pi a^2 - 6\pi\eta aV_r = (\alpha - \beta V_r)m$$

where $$\alpha = \frac{V_\theta^2}{R} - \frac{p\pi a^2}{m}$$

$$\beta = \frac{6\pi\eta a}{m}$$

The solution to equation of motion is the radial velocity:

$$V_r = \frac{\alpha}{\beta}(1 - e^{-\beta t})$$

with acceleration time-constant, $\tau$, given as:

$$\tau = \frac{1}{\beta} = \frac{m}{6\pi\eta a}$$

and terminal velocity of $$V_\infty = \frac{\alpha}{\beta}$$

The corresponding relationships for inward motion where transverse pressure is dominant and may be derived by changing the polarity of the centrifugal and pressure driven forces in the equation of motion.

This transit time has to be considered together with sedimentation time given by:

$$\tau_s = \frac{h}{V_y}$$

where h is channel height and $V_y$ is given by $$V_y = \frac{\gamma 4/3\pi r^3 \rho_{particle} g}{6\pi\eta a}$$

and $\gamma$ is the buoyancy term given by:

$$\gamma = \frac{\rho_{particle} - \rho_{fluid}}{\rho_{fluid}}$$

For particle separation, these relations are used to design a device for the desired particle size range. In this way, in one contemplated form of the presently described embodiments, a parallel array of collection outlets accumulate particles of the designed size range based on transit times and transverse migration velocities.

Figure 5:
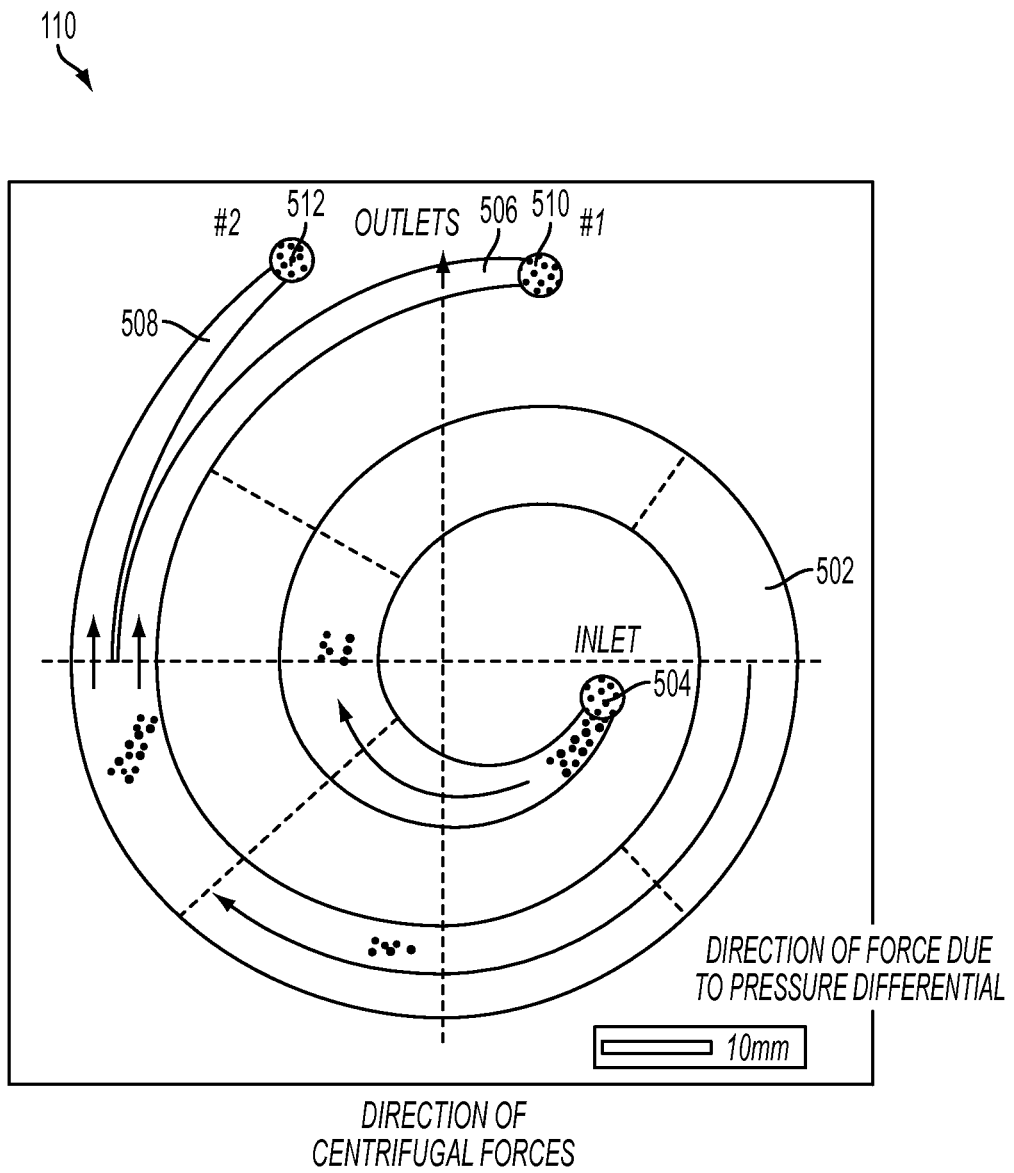
FIG. 5 is an illustration of one form of a fluid separation device according to the presently described embodiments.

In this regard, with reference now to FIG. 5, one form of a separation device 110 according to the presently described embodiments is shown. This form shows an expanding spiral channel 502 with increasing radius of curvature. This geometry takes advantage of the rate of pressure change: $dp/dR \propto 1/R^2$. In another form, the device may have a contracting spiral channel with decreasing radius of curvature for the side walls in either case, the channel 502 evolves from inlet 504 into two separate channels 506 and 508 (e.g., also referred to as channel #1 and channel #2) to respective outlets 510, 512.

Figure 6:
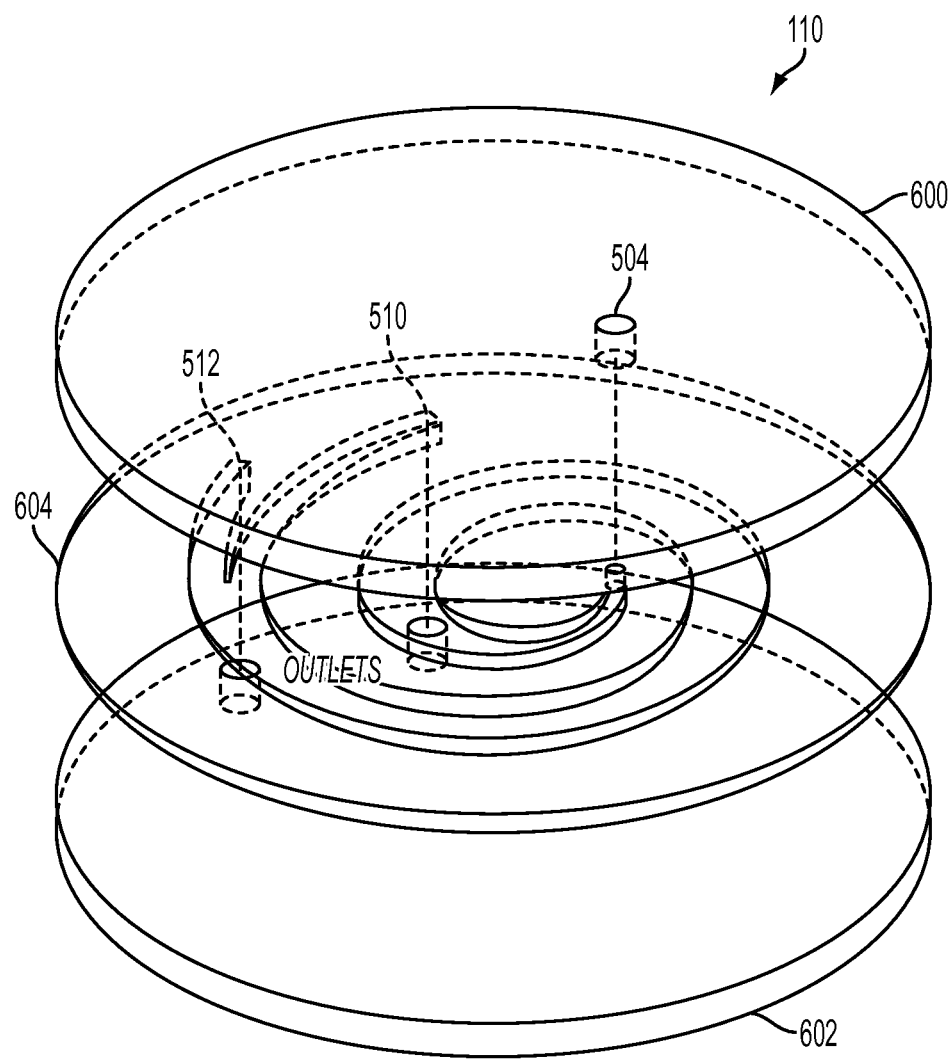
FIG. 6 is another illustration of the fluid separation device of FIG. 5.

An exploded view of the spiral separator device 110 of FIG. 5 is shown in FIG. 6. In one form, the width of the widest section of the separation channel 502 is, for example, 10 mm and tapers to 5 mm near the inlet 504 and outlets 510, 512. The inlet 504 is near the center of the separator 110 and the outlets 510, 512 are near the outer perimeter. Particles move with the fluid but also migrate across the channel cross-section. In one form, the height of the channel structure varies, for example, from 0.5 mm to 2 mm. Each outlet 510, 512 selectively collects separated particles depending on the fluidic velocity. Particles are collected in channel #1 (506) and #2 (508) at low and high fluid velocity, respectively. Thus, the spiral separator separates water flowing through, into at least two streams of water, a first stream of water having at least some particles (e.g., floc) removed, and the second stream of water including a concentrated amount of particles (e.g., floc).

The channels 502, 506 and 508 may be formed in a variety of manners, e.g., by cutting Acrylic sheets 600, 602 and 604 (³⁄₁₆" and ¹⁄₁₆" thickness) to the required dimensions using a laser cutter. The channels are then cut in the sheet 604. In one form, sheets 600 and 602 form the top and bottom covers and also provide holes for inlet 504 and outlets 510, 512. Although not shown, two 500 µm thick silicone sheets may form the fluidic seals at the two interfaces between the three Acrylic layers.

Notably, the presently described embodiments provide for particle separation in a variety of manners. For example, depending on the flow rate, the particle separation may be driven by the centrifugal force or the pressure that is created by the flow of fluid through the channel. In this regard, different outcomes result from the two different inlet flow rates. In either case, particle separation occurs.

Figure 7:
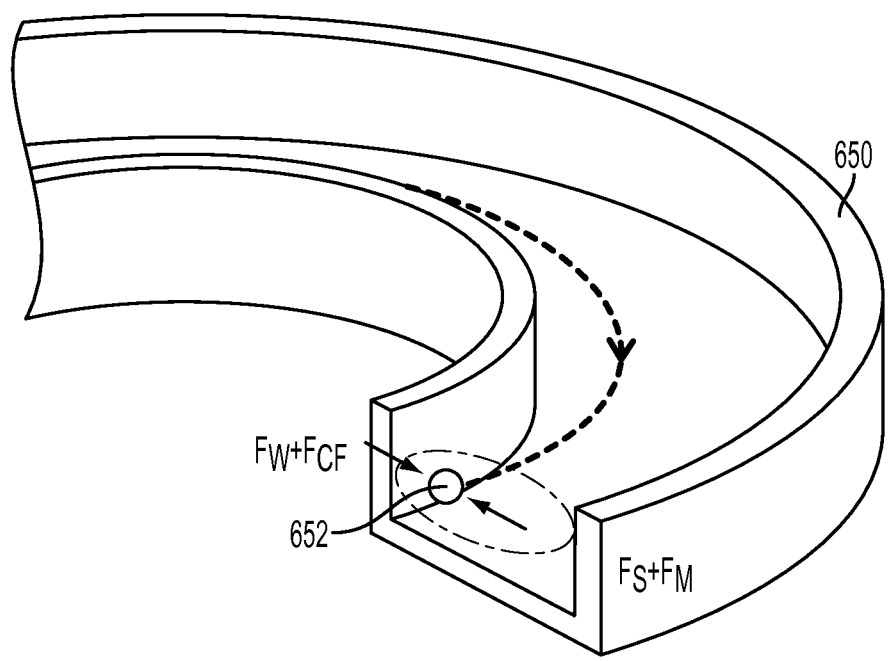
FIG. 7 is a representation of a neutrally buoyant particle flowing through a channel and forces acting thereon.

Turning to FIG. 7, depicted is a second particle separation embodiment for neutrally buoyant particles. This figure is referred to for a description of hydrodynamic separation where purely fluidic flow in curved channel structures create the necessary migration, focusing, and diversion of a tubular band as the waste stream.

More particularly, in FIG. 7, a curved channel 650 (e.g. a curved portion of a spiral) has a particle 652 flowing therethrough. As can be seen, asymmetric tubular pinch effects in the channel—created by various forces—are shown. The forces include a lift force $F_W$ from the inner wall, a Saffman force $F_S$, Magnus forces $F_m$ and a centrifugal force $F_{cf}$. It should be appreciated that the centrifugal force $F_{cf}$ is generated as a function of the radius of curvature of the channel. In this regard, this added centrifugal force $F_{cf}$ induces the slow secondary flow or Dean vortex flow (shown by the dashed arrows) which perturbs the symmetry of the regular tubular pinch effect. Particles are concentrated in the inner equilibrium of the velocity contour (shown in the dashed ellipses).

Thus, while the first particle separation embodiment requires density difference for centrifugal force to move suspended particles relative to the fluid, this embodiment moves the fluid particles which creates a viscous drag on the neutrally buoyant suspension causing particles to migrate to a new position where force equilibrium localizes them to form the tubular band. Fluidic shear in straight channels is known to generate lateral forces which cause inertial migration of particulates. Segre and Silberberg experimentally demonstrated the tubular pinch effect in a straight channel where neutrally buoyant particles migrate to form a symmetric band that is 0.6D wide, where D is the channel diameter. In quadratic Poiseuille flow, three contributions have explained the lateral migration of a rigid sphere. The wall lift, $F_w$, acts to repel particulates from the wall due to lubrication. The second contribution is the Saffman inertial lift towards the wall due to shear slip, $$F_s = 6.46 \eta V a R_e^{1/2}$$

where $\eta$, V, a, and $R_e$ are respectively, the fluid viscosity, average channel velocity, particle radius, and channel Reynold's number given by:

$$R_e = \rho V D / \eta$$

with $\rho$ and D being the fluid density and hydraulic diameter of the channel. The third is the Magnus force due to particle rotation towards the wall, $$F_m = \pi a^3 \rho \vec{\Omega} \times \vec{V}$$

where $\vec{\Omega}$ is the angular velocity given by $\Delta V/r$ and $\Delta V$ is the differential velocity across the particle. $F_w$ dominates near the wall and achieves equilibrium with the combined effects of $F_s$ and $F_m$ to confine particles in a band. Segré and Silberberg developed a reduced length parameter to scale this tubular pinch effect in a simple form within a straight channel, $$L = \left(\frac{\rho V l}{\eta}\right)\left(\frac{a}{d}\right)^3$$

where l is the actual channel length and d is the hydraulic channel radius. In curvilinear channel geometry, a centrifugal force modifies the symmetric tubular pinch effect. The fluid inertia from this force causes a secondary transverse flow or Dean vortex which is a double recirculation. The Dean number is a measure of the strength of this recirculation:

$$D_e = 2(d/R)^{1/2} R_e$$

where R is the radius of curvature of the channel. Particles in mid-elevation migrate transversely outward with the Dean vortex, are repelled by the wall lift, and continue to loop back along the top and bottom walls towards the inside wall. The combined Saffman and Magnus forces is large in comparison to the viscous drag of the Dean vortex so particles are trapped in a force minimum located adjacent and closer to one side wall. At low flow rates, the band is closer to the inner side wall. At high flow rates, the band migrates to a location adjacent the outer side wall.

So, it is apparent that the tubular band is formed as a function of at least one of fluid viscosity, average channel velocity, particle radius, fluid density, hydraulic diameter of channel, angular velocity, and differential velocity across particles. Moreover, as noted above, one aspect of the present innovation is to control the tubular band to be offset from the center of the channel as a function of a radius of curvature of the spiral channel. So, the configuration and operation of the system is a function of the factors contemplated, for example, by the generic expression $$L = \left(\frac{\rho V l}{\eta}\right)\left(\frac{a}{d}\right)^3.$$

These factors or parameters are highly scalable and will vary as a matter of application in the range from micro-scale devices to macro-scale devices.

Returning attention again to FIG. 1, an optional filter 112 is inserted following the spiral separator 110 to insure against abnormal operation conditions and/or feed water quality variations. A filter with the proper mesh rating to meet the required standards may be used. During normal operation, the filter will require only infrequent back flush.

Figure 8:
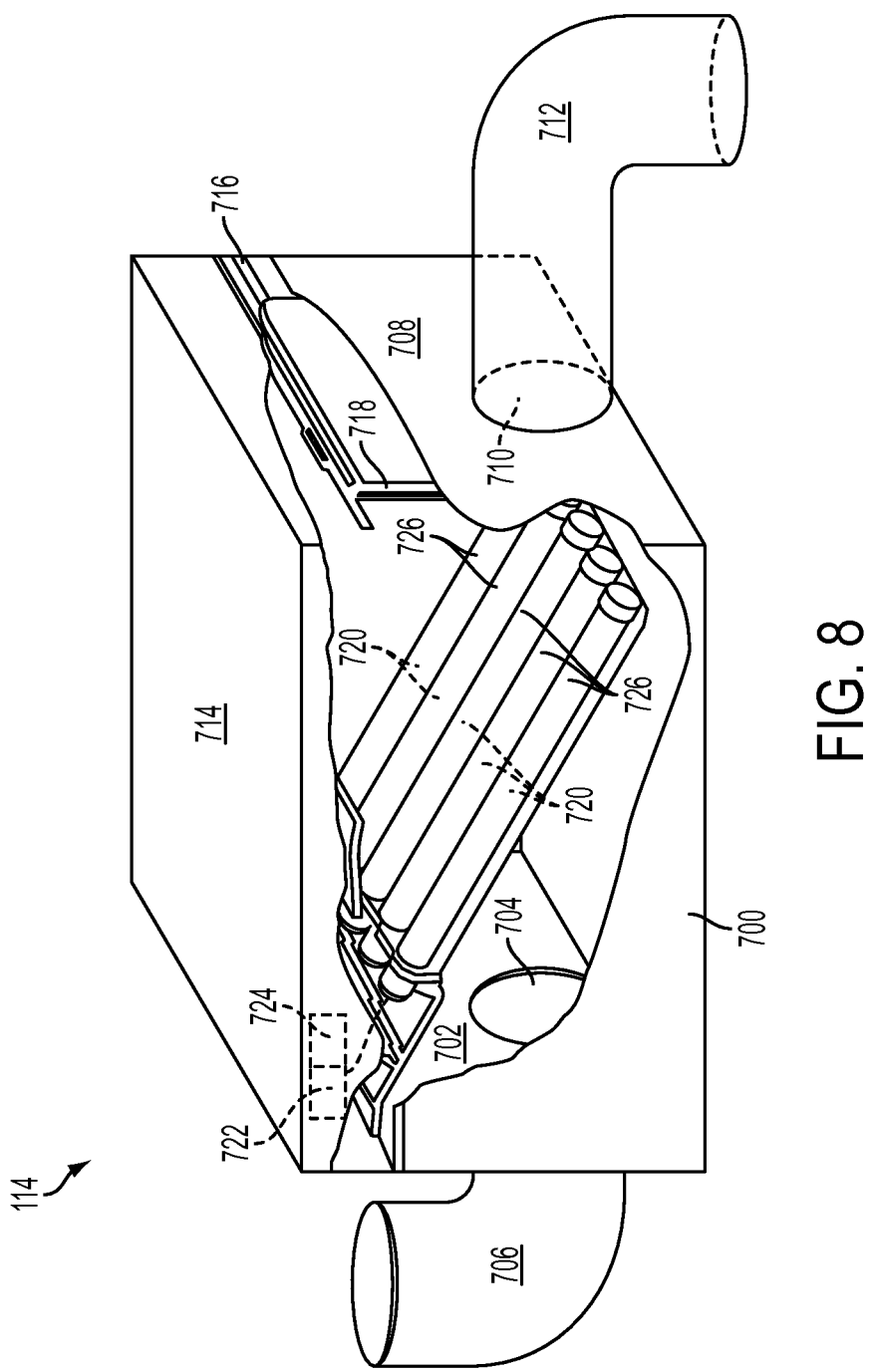
FIG. 8 sets forth a perspective cutaway view of an ultraviolet sterilization system which may be used in the system of the present application.

As previously described, water 102 with the floc removed is provided to UV sterilization system 114. It is to be understood that many UV systems exist, and may be employed as UV sterilization system 114. For example, FIG. 8 provides a perspective view of an ultraviolet water disinfection system which may be used as UV system 114 of FIG. 1. UV system 114 of FIG. 8 comprises a water treatment chamber 700 having an inlet end 702 including an inlet opening 704 to which is connected a suitable tube or conduit 706 for delivering water to treatment chamber 700. Chamber 700 further includes an outlet end 708 having an outlet opening 710 to which is connected suitable tube or conduit 712 through which the treated water is discharged. Treatment chamber 700 further comprises a lid 714 which is hingedly mounted by means of a suitable hinge 716. The inside surface of lid 714 is preferably a reflective material for reflecting the ultra-violet radiation back downward into the water being treated.

UV system 114 further comprises a rack 718 for supporting a plurality of tube-type ultra-violet lamps 720 in a parallel spaced array.

Rack 718 is preferably constructed of materials which are not deleteriously affected by prolonged contact with water. Furthermore, rack 718 is designed to be removably suspended from lid 714 of chamber 700 so that it rests on the bottom surface of chamber 700 when lid 714 is closed, but is lifted out of chamber 700 when lid 714 is raised. A suitable power supply with wiring 722 for providing power to UV lamps 720 is provided with automatic power switch 724 preferably affixed to the outside of treatment chamber 700 so that the power to the system automatically shuts off when lid 714 is opened.

With the configuration of support rack 718 as shown and described, the array of UV tubes is lifted from the treatment chamber 700 when lid 714 is pivoted to an open position. This allows easy cleaning of the protective tubes 726 which house UV lamps 720 and replacement of UV lamps 720. Furthermore, with this configuration, all the water passing through treatment chamber 700 by necessity passes through the array of UV lamps, flowing around the lamps and therebetween to provide sufficient exposure time of the water to the UV radiation to effect disinfection of the water. Regardless of the depth of the water in treatment chamber 700, all the water passes through the array of lamps 720, with a greater portion of each lamp being submerged as the liquid level becomes higher. Additionally, based on the angled orientation of the UV lamps, the UV lamps are in a wet/dry orientation during operation of the system wherein a portion of the lamps is submerged and a portion is not submerged. The nonsubmerged portion transmits UV radiation throughout the box through the air and those rays are reflected back down into the water by the reflective surface on the inside of lid 714.

Other UV sterilization systems which can be employed in the present application from a variety of companies including UV Waterworks from WaterHealth International Inc. of Irvine, Calif. and United Industries Group Inc. of Newport Beach, Calif., among others. Additionally, the sterilization process of system 100 may be accomplished by use of other sterilization technologies such as by use of different irradiation technologies. Additionally, as previously mentioned, advanced oxidation techniques using photocatalytic materials such as, but not limited to, $TiO_2$ can be used, either as surface coating of the inside of the spiral separator 110, and/or as dispersion of a nanoparticles into the source water.

Figure 9:
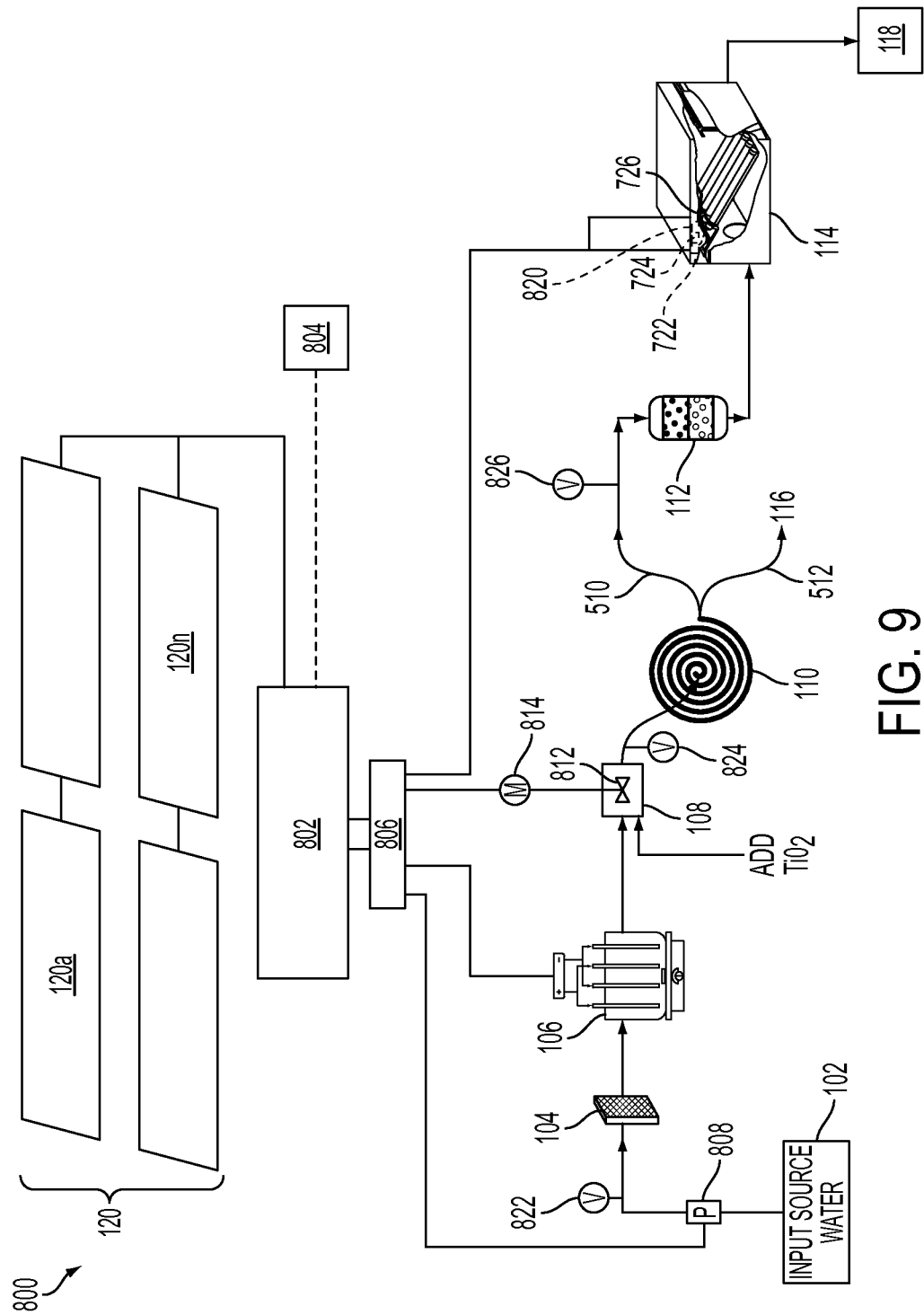
FIG. 9 illustrates an embodiment of a standalone integrated water treatment system for distributed water supply according to the concepts of the present application.

Turning to FIG. 9, illustrated is a more detailed water treatment system 800 in accordance with the present application.

System 800 includes solar (PV) power supply system 120 which converts sunlight into electricity which is in turn stored in battery storage 802. The solar power supply system 120 is configured of multiple individual solar panels, such as 120a-120n, arranged in an appropriate configuration such as parallel and/or serial arrangements to provide the amount of energy needed to run system 800. In an alternative embodiment, a manually operable generator or dynamo 804 is included to generate power when sunlight is not available for conversion. An electrical power controller 806 is provided in operative connection to battery storage 802 to control the energy provided to components of the integrated water treatment system 800 of FIG. 9.

In operation system 800 receives source water 102 via use of an input pump system 808 supplied with power from controller 806 at a suitable inlet (shown representatively) from an input water source that is, in one form, flowed through mesh filter 104. It should be appreciated that mesh filter 104 is designed to filter out relatively large particles from the input water. In this regard, the filter 104 may be formed of a 2 mm-5 mm mesh material, although other sized filters may be used.

Water 102 which has passed through filter 104 is provided to the previously discussed electrocoagulation system 106. As illustrated in this drawing, the electrocoagulation system is supplied with power, again, by controller 806. Water output from electrocoagulation system 106 is then passed to the maturation buffer tank 108.

The output from buffer tank 108 is passed to spiral separator 110 which has a water (or effluent) output 510 (see FIG. 5). The output 510 directs a water stream, which has been separated from the floc, to the optional filtering mechanism 112 before the UV sterilization system 114. The output of the UV sterilization system 114 typically comprises the treated potable water 118.

Spiral separator 110 has a second output 512 (FIG. 5) from which waste water is passed. The waste water can be disposed of in an appropriate manner.

Returning attention to the UV sterilization system 114 in the present embodiment, it can be seen by FIG. 9 this unit is energized via controller 806 as with other components of system 800. UV sterilization unit 114 is further configured with a safety switch 820 which is connected to automatic power switch 724. In this design, the safety switch 820 senses a malfunction of the UV tubes 720 and relays this information to controller 806. Controller 806 then shuts down operation of system 800 to ensure that improperly processed waste water does not become delivered to users as clean drinking water. It is to be understood the safety switch 820 is given as an example, and other safety mechanisms may also be associated with other components of system 800, such as but not limited to proper operation of the electrocoagulation system and the spiral separator, among others.

System 800 also shows the use of pressure relief valves 822, 824, 826 implemented to ensure proper water pressure in the system.

It is to be appreciated filter arrangements 104 and 112 may each be comprised on a single filter stage, or multiple filter stages, and each are, in some embodiments, replaceable and/or alternatively able to be removed, cleaned and reused.

Having described the system of FIG. 9 along with the more general description of FIG. 1, with the details of FIGS. 2-7, it is understood a system as developed according to the concepts and teachings described herein will in some embodiments be designed to serve communities of 500 to 1,500 people, which require approximately 35-75 gpd (i.e., gallons per day) per person and the system (100 or 800) with a water treatment rate of 100 Lpm (i.e., liters per minute). The system has several advantages to existing systems including a small footprint, and an efficient use of materials and lowered energy use. For example, by use of the electrocoagulation system, the cost and waste of chemical coagulation is avoided. Particularly, in comparing the aspects of electrocoagulation to conventional chemical coagulation, electrocoagulation is understood to operate and be maintained at a much lower cost than conventional chemical coagulation. Electrodes are compact, and replacement is required only when necessary. On the other hand, in conventional chemical coagulation, only about 5.0% to 7.0% of the coagulation chemical added to a waste stream are often actually used for the coagulation process. The remaining percentage of the materials are wasted and returned, possibly to the environment. It is also common when using conventional chemical coagulation that the system may be overdosed with the chemical coagulant, which requires cleanup prior to discharging the water back into the water supply, whereas in the electrocoagulation only the needed electrode material is dissolved by electrochemical processes.

Chart 1 below illustrates energy and cost comparisons between conventional chemical coagulation and electrocoagulation:

CHART 1

| | volume to treat (1000 gal) [V] | | | 3.8 | $m^3$ |
| | ion concentration needed (2 mM) [$C_i$] | | | 2.00E−03 | $kmol/m^3$ |
| | Faraday constant [F] | | | 9.65E+07 | C/kmol |
| | power cost [$\Delta C_P$] | | | 1.00E−01 | $/kWh |

| | mol weight [kg/kmol] [$M_w$] | cost [$/kg] [$C_w$] | valence [z] | mass fraction of coagulant [f] | coagulant cost [$/kg][1] [$DC_C$] | |
|---|---|---|---|---|---|---|
| Al | 27 | 2.4 | 3 | 5.70% | 0.242 | $KAl(SO_4)_2*12(H_2O)$ |
| Al | 27 | 2.4 | 3 | 8.11% | 0.242 | $Al_2(SO_4)_3*18(H_2O)$ |
| Fe | 55.8 | 0.8 | 2 | 20.64% | 0.506 | $FeCl_3*6(H_2O)$ | calculations based on a small flow cell - resulting in small overall flow rate

CHART 1-continued

| EC | | | | | |
|---|---|---|---|---|---|
| electrode area (900 cm^2)[A] | | 9.00E−02 | m^2 | | |
| electrode spacing (0.4 cm) [d] | | 0.004 | m | | |
| flow rate (0.7 l/min)[q] | | 1.1667E−05 | M^3/s | | |
| solution conductivity (0.85 mS/cm) [σ] | | 8.50E−02 | S/m | | |
| time to treat volume [t] | | 325714.286 | s | (≈90 h) | |

| | Al | Fe | |
|---|---|---|---|
| Faraday resistance (d/σ = 0.471 cm^2/mS) [P_o] | 0.5 | 0.2 | W |
| current multiplayer [ΔI] | 2 | 1 | |

| | mass [kg] [m] | metal cost [$] [C_m] | current [A/m^2][i] | power [kW][P_EC] | power cost [$][C_EC] | total cost [$] [C_EC,tot] |
|---|---|---|---|---|---|---|
| Al | 0.2052 | 0.49 | 75.0454 | 0.0065 | 0.06 | 0.55 |
| Fe | 0.4241 | 0.34 | 50.0303 | 0.0108 | 0.10 | 0.44 |

| | standard aggregation | | | | | |
|---|---|---|---|---|---|---|
| | pure metal mass [kg] [m] | mass[kg][m_C] | coagulant cost [$][C_C] | power [kW]^2[P_S] | power cost [$][C_S] | total cost [$][C_S,tot] |
| Al | 0.2052 | 3.6000 | 0.87 | 17.4679 | 1.75 | 2.52 |
| Fe | 0.4241 | 2.0547 | 1.04 | 17.4679 | 1.75 | 2.79 |

[1] From Penitencia water treatment plant May '07
[2] Mostly for initial rapid mix of coagulant
[3] Marin County Desalination Plant Estimate A further beneficial aspect of the integrated system of the present application is the use of a spiral separation device. This device requires low power for operation, and has low pressure consumption characteristics, which is useful in a compact integrated system for the electrical grid use. For example, in a system as described in the present application (i.e., for a 100 Lpm spiral unit), the spiral separation device would require:

$$\Delta P = 2 \text{ psi}$$

$$\text{Power} = 20 \text{ W}$$

where Power is the friction loss through the spiral separation device $$Q = 100 \text{ L/min}$$

where Q is the flow rate.

Conventional water treatment systems include the sequential steps of coagulation, flocculation, and sedimentation; requiring long process times (hours) and large land space. This invention replaces the sedimentation step with spiral separation resulting in the much smaller foot print necessary for a distributed (and mobile) water treatment system. The rapid process (reduced from hours down to minutes), reduced chemical dosage (50%), and low power requirement all contribute to the concept of a small foot print device that can be quickly deployed.

A further advantage of the present system is the implementation of a UV sterilization system. Such compact ultraviolet water disinfection systems which work on a small scale, are energy efficient, and provide a low-maintenance design. Typical small-scale sterilization units operate using the equivalent of a 60 watt light bulb at a cost of as little as 4 cents/ton of water treated, when treating 15 Liter/minute, which is sufficient for a water treatment system designed to supply water to 500 to 1,500 people.

Proper dosages in a UV system are dependent upon the matter being sterilized. However, it is known that for sterilizing bacteria and viruses, a system would apply 2,000 to 8,000 μW-s/cm$^2$, and for sterilizing Giardia, Cryptosporidium, etc., the UV system would apply 60,000 to 80,000 μW-s/cm$^2$. It is also to be understood such sterilization units may use 6,000 times less energy than traditional boiling techniques.

It is also known that UV light (240-280 nm) will deactivate DNA of microorganisms. Microorganisms cannot, therefore, replicate and soon will die. There is also no effect on the taste or smell of the water, and many times treatment takes as little as 12 seconds.

With attention to the solar considerations of the present water treatment system, the device in accordance with the parameters set forth in this application, such as a 100 Lpm system, may require as much as 50 KWH. And it is known:

For 250 W/m$^2$ solar panels 10 hour solar collection and energy storage, will require 50,000/10/250~20 m$^2$, solar panels, where 50,000 is the total electric power needed in a 24 hour period; 10 is the number of hours for solar energy collection, 250 is electrical power generated by 1 square meter of solar panel; and 20 m$^2$ is the total area of solar panel that is required.

Then to power an electrocoagulation system with (Al electrodes) the required power would be approximately:

37.89×0.024×24=22 KWH, where 37.89 is the multiple of 1000 gal processed per day; 0.024 is the power needed to process 1000 gals; and 24 is the 24 hour period of operation.

For operation of the spiral separator, the required power would be approximately:

1 HP (20$W$+head loss)~746×24=18 KWH, where 20 W is friction loss through the separator; head loss is pressure and friction losses through the piping; 746 is wattage per HP; and 24 is the 24 hours of operation.

For operation of the UV Sterilization System, the required power would be approximately

60$W$×(100/15)×24=9.6 KWH, where 100 is the flow rate in liters/minute; 15 is designed flow rate in liters/minute for the UV WaterWorks system; and 24 is 24 hours of operation.

Figure 10:
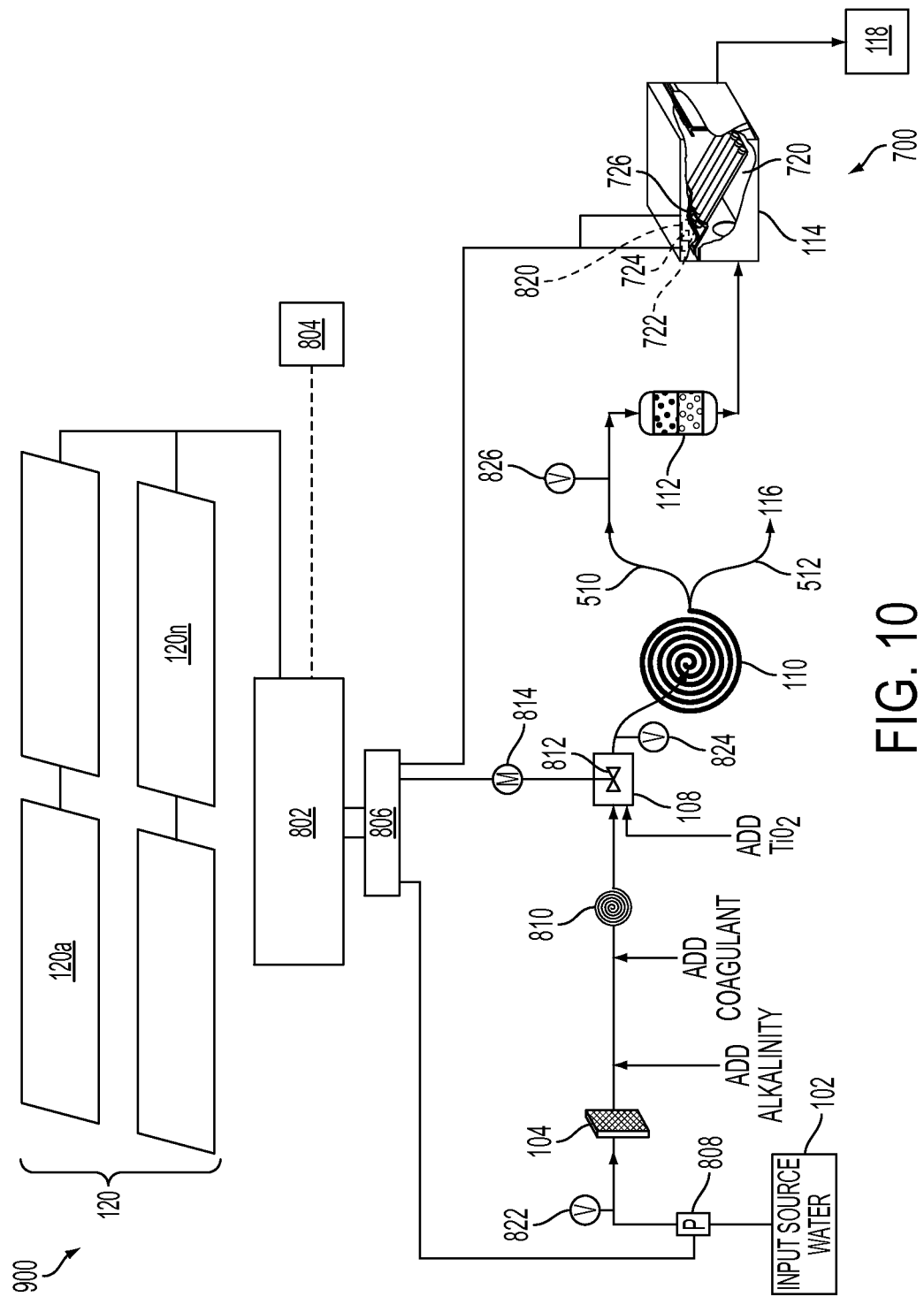
FIG. 10 illustrates another embodiment of a standalone integrated water treatment system for distributed water supply according to the concepts of the present application.

Turning to FIG. 10, illustrated is a further embodiment of a standalone integrated water treatment system according to the present application. As mentioned above, conventional chemical coagulation processes have certain drawbacks which work against their implementation in small integrated water treatment systems. However, FIG. 10 depicts an integrated, small footprint water treatment system 900 which includes in-line chemical coagulation and flocculation for the generation of aggregated floc particles within spiral channels of the spiral mixer 810. In addition, to fluid shear, the relative narrow confines of the spiral channels allow for effective diffusion of chemicals as the diffusion length is of the order of the channel width. Whereas conventional water treatment systems employ relatively large coagulation and flocculation basins which extend the aggregation time. The in-channel aggregation of floc particles is possible at least in part due to this limited diffusion length. The present embodiment also provides a customized shear rate performing a size-limiting function so that dense uniform-sized aggregated floc particles are formed These uniformly-sized aggregated floc particles can aggregate rapidly in the buffer tank to be separated without the need for downstream sedimentation. Proof of concept experiments have shown that the more efficient mixing and separation described allows a 50% reduction of coagulant dosage to achieve the same turbidity reduction capability of conventional systems requiring extended sedimentation. Additionally, spiral mixer 810 may also operate as a spiral mixer-conditioner, where mixing takes place in the channels of the turns operated at or above the critical Dean number (at or greater than 150), and aggregation conditioning occurs in the channels of the turns where the operation is below the critical Dean number.

In exemplary system 900, input source water 102 is received at a suitable inlet, which in one form is a mesh filter 104. It should be appreciated mesh filter 104 is designed to filter out relatively large particles from the input source water. In this regard, the filter 104 may be formed of a 2 mm-5 mm mesh material. Alkalinity is added in-line in the form of a base to the input source water after filtering by mesh filter 104 to adjust for pH throughout the process. Any suitable base may be used. Coagulant is added to the input water after the alkalinity base is added and prior to mixing in spiral mixer 810. Any suitable coagulant is used.

Spiral mixer 810 receives the input source water, treated with the alkalinity, and the coagulant. The spiral mixer shown in FIG. 10 serves a dual purpose. First, it provides a flash mixing function where the incoming source water is angled at the inlet to cause chaotic mixing when the source water impinges on a lower spiral channel wall of spiral mixer 810. Secondly, custom shear is designed into the fluidic flow rate in the channel to achieve a shear rate which limits growth of loose floc. The resulting floc particles are dense and uniform within a narrow size range of 5-10 um. These dense, uniformly sized floc particles ensure rapid aggregation. The spiral mixer 810 has an output that connects to a buffer tank 108. The source water is held in the buffer tank for a determined buffer time (e.g., in some cases about four minutes) to allow for fluid impedance matching between spiral mixer 810 and a spiral separator 110.

The output of the buffer tank 108 is connected to the spiral separator 110 which has an effluent output 510. The effluent output 510 directs effluent separated out from the source water input to the spiral separator to filtering mechanism 112. Output of filtering mechanism 112 typically comprises treated water that may be further added upon by UV sterilization 114. Spiral separator 110 has a second output line 512 in which waste water travels. The waste water can be disposed of in an appropriate manner.

Spiral mixer 810 may take a variety of forms, including that described in U.S. Ser. No. 11/936,753, filed on Nov. 7, 2007, entitled "Device and Method for Dynamic Processing in Water Purification," among others. In this regard, the spiral mixer may take a physical form substantially similar to that of a spiral separator with some minor and/or functional modifications. Further, the angle θ of impingement is approximately 90 degrees where the fluid is received would, for a spiral mixer, be tuned to create sufficient turbulence in the channel to mix, rather than separate, the particles of the source water (as noted above). Also, as noted above, the growth of floc is controlled in the mixing state as a result of shear forces.

It is to be appreciated that in certain instances devices and systems of the present application such as electrocoagulation units, solar panels and/or sterilization units may be obtained from manufacturers as off-the-shelf devices. It is understood to construct a cost-efficient standalone integrated water treatment system according to the present application, these off-the-shelf systems may be integrated into this water treatment system.

It will also be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A stand-alone integrated water treatment system for distributed water supply comprising:
   a filtered input for receiving and treating water;
   a coagulation system in operative connection with the filtered input, wherein the water which has been filtered is processed by a coagulation process by the coagulation system to create pin floc suspensions in the water;
   a maturation buffer tank in operative connection with the coagulation system, wherein the pin floc is aggregated to a larger size in the water;
   a planar spiral separator having a curved channel comprising side walls and top and bottom walls perpendicular to the side walls, the curved channel being in operative connection with the maturation buffer tank, wherein the water is separated into two water streams a first stream of water having a majority of the floc removed and a second stream of water which includes a concentrated amount of the floc, wherein separation within the channel is based on the curvature of the channel in combination with at least one of velocity and pressure profiles within the channel, or hydrodynamic forces within the channel;

a sterilization system in operative connection with the spiral separator and configured to receive the first stream of water and to perform a sterilization operation on the first stream of water;

an output for outputting the water from the sterilization system as potable water; and at least one power supply for providing power to the stand-alone integrated water-treatment system.

2. The system of claim 1 further including a filtration arrangement in operative connection with the sterilization system to receive the water of the first stream of water from the spiral separator tank before it has been sterilized by the sterilization system.

3. The system of claim 1 wherein the at least one power supply is a system in operative connection with at least one of the coagulation system, the maturation buffer tank, the spiral separator, and the sterilization system.

4. The system of claim 1 wherein the coagulation system is an electrocoagulation system.

5. The system of claim 1 wherein the coagulation system is a chemical coagulation system.

6. The system according to claim 1 wherein the spiral separator separates floc according to size.

7. The system according to claim 1 wherein the maturation tank generates floc to a size of or larger than a cutoff size of the spiral separator.

8. The system according to claim 1 wherein the spiral separator is configured to move floc at the cutoff size or above the cutoff size to the second stream of water.

9. The system according to claim 1 wherein the coagulation system is an off-the-shelf system and the sterilization system is an off-the-shelf system.

10. The system according to claim 1 wherein the at least one power supply is a solar power supply and it provides all of the power needed to operate the system.

11. The system according to claim 1 wherein the at least one power supply is a wind turbine and it provides all of the power needed to operate the system.

12. The system according to claim 1 wherein the at least one power supply is a hydroelectric power supply and it provides all of the power needed to operate the system.

13. The system according to claim 1 wherein power from the at least one power supply is electric power and is stored in a battery system, so the water treatment unit can be operated independent of the operation of the power supply.

14. The system according to claim 1 further including a spiral mixer in operative connection with the coagulation system and the maturation buffer tank, wherein water from the coagulation system is provided to the spiral mixer, and water from the spiral mixer is provided to the maturation buffer tank.

15. The system according to claim 14 where a shear rate in the spiral mixer is matched to a slow mix shear rate in the maturation buffer tank to prevent breakup of the floc.

16. The system according to claim 14, wherein the spiral mixer includes having an angled inlet configured to cause chaotic mixing when the water from coagulation system impinges on a lower spiral channel wall of the spiral mixer.

17. The system according to claim 1, wherein the spiral separation system and the sterilization system are combined, and the sterilization system is a UV sterilization system including $TiO_2$ dispersed within the water, the dispersed $TiO_2$ being recovered by the spiral separator.

18. The system according to claim 1, wherein the spiral separation system and the sterilization system are combined, and the sterilization system is a UV sterilization system including $TiO_2$ coated on inner surfaces of the spiral separator.

19. The system according to claim 1 where a shear rate in the spiral mixer is customized to produce dense floc of a given uniformity that aggregates rapidly in the maturation buffer tank.

20. The system according to claim 1 wherein flow length of the channel of the planar spiral separator is designed to meet channel width and flow velocity for a predetermined floc size range.

21. The system according to claim 1 wherein the rate at which water is treated is 100 liters per minute.

22. A stand-alone integrated water treatment system for distributed water supply comprising:

a filtered input for receiving and treating water;

a coagulation system in operative connection with the filtered input, wherein the water which has been filtered is processed by a coagulation process by the coagulation system to create pin floc suspensions in the water;

a maturation buffer tank in operative connection with the coagulation system, wherein the pin floc is aggregated to a larger size in the water;

a spiral separator having a curved channel cut into a sheet of material, with a height of the channel approximately between 0.5 mm to 2 mm, the spiral separator in operative connection with the maturation buffer tank, wherein the water is separated into two water streams a first stream of water having a majority of the floc removed and a second stream of water which includes a concentrated amount of the floc, wherein separation within the channel is based on the curvature of the channel in combination with at least one of velocity and pressure profiles within the channel, or hydrodynamic forces within the channel;

a sterilization system in operative connection with the spiral separator and configured to receive the first stream of water and to perform a sterilization operation on the first stream of water;

an output for outputting the water from the sterilization system as potable water; and at least one power supply for providing power to the stand-alone integrated water-treatment system.

23. The system according to claim 22, wherein the curved channel of the spiral separator further includes a top cover and a bottom cover.

* * * * *